(12) United States Patent
Orbach

(10) Patent No.: US 8,285,338 B2
(45) Date of Patent: Oct. 9, 2012

(54) METHOD AND APPARATUS FOR INCOMING CALL PAUSE NOTIFICATION

(75) Inventor: Julian James Orbach, Macquarie Park (AU)

(73) Assignee: Avaya Inc, Basking Ridge, NJ (US)

( * ) Notice: Subject to any disclaimer, the term of this patent is extended or adjusted under 35 U.S.C. 154(b) by 1595 days.

(21) Appl. No.: 10/810,526

(22) Filed: Mar. 27, 2004

(65) Prior Publication Data
US 2005/0227740 A1    Oct. 13, 2005

(51) Int. Cl.
*H04M 1/00* (2006.01)
*H04L 12/58* (2006.01)

(52) U.S. Cl. .................................. 455/567; 455/412.1

(58) Field of Classification Search ............. 455/566, 455/567, 414.1, 415, 412, 445, 412.1, 412.2, 455/422.1, 456.1, 423, 435.2; 370/352; 379/80, 379/266.06, 433.02; 709/227; 342/457
See application file for complete search history.

(56) References Cited

U.S. PATENT DOCUMENTS

| | | | |
|---|---|---|---|
| 5,034,975 A | | 7/1991 | Grimes |
| 6,216,016 B1 * | | 4/2001 | Cronin ......................... 455/567 |
| 6,549,792 B1 | | 4/2003 | Cannon et al. |
| 6,704,565 B1 * | | 3/2004 | Parsons et al. ............. 455/414.1 |
| 6,782,252 B1 * | | 8/2004 | Kang et al. ...................... 379/80 |
| 6,836,478 B1 * | 12/2004 | Huang et al. ................... 370/352 |
| 7,181,192 B2 | | 2/2007 | Panasilk |
| 2002/0142756 A1 * | 10/2002 | Rutledge et al. ............. 455/412 |
| 2003/0061354 A1 * | | 3/2003 | Burg et al. ..................... 709/227 |
| 2004/0198461 A1 * | 10/2004 | Coombes ....................... 455/567 |
| 2005/0096023 A1 * | | 5/2005 | Moore ........................... 455/415 |

FOREIGN PATENT DOCUMENTS

| | | |
|---|---|---|
| DE | 199 61 510 A1 | 6/2001 |
| EP | 0 851 699 A | 7/1998 |
| JP | 2001308984 A1 | 2/2001 |
| WO | WO 01/45365 A | 6/2001 |

OTHER PUBLICATIONS

EPO Search Report, Jun. 14, 2005.

* cited by examiner

*Primary Examiner* — Kiet Doan
(74) *Attorney, Agent, or Firm* — John C. Moran

(57) ABSTRACT

Alerting a calling party of a delay before an incoming call will be answered by a user of a called telecommunication terminal. The incoming call is answered by the telecommunication terminal or a switching system to which the telecommunication terminal is connected in response to an input from the user when the telecommunication terminal is not engaged in another call. An audio path of the answered call is muted from communication with the user. A message is transmitted to the calling party where the message is selected by the user.

24 Claims, 6 Drawing Sheets

METHOD AND APPARATUS FOR INCOMING CALL PAUSE NOTIFICATION

TECHNICAL FIELD

This invention relates to telecommunication systems and, in particular, to the operations with respect to incoming calls.

BACKGROUND OF THE INVENTION

Within the prior art, one of the problems with wireless telephones (also referred to as cellular telephones or mobile telephones) is that an incoming call may be received by the wireless telephone when it is not convenient for the user of the wireless telephone to respond to that call. For example, the user may be in a conference, restaurant, automobile, or other locations in which it is inconvenient or unsafe to respond to an incoming call. In the prior art, it is a common event to see someone scurrying out from a room so that they may speak on their wireless telephone and not disturb other individuals, hoping to reach a location where they can respond to the call before the calling party hangs up. The prior art teaches the utilization of vibrators within wireless telephones for the purpose of indicating an incoming call so that there is not the annoying problem of the wireless telephone ringing. However, this does not help the user of the wireless telephone who is scurrying to reach a location where they can respond to the incoming call.

Within the prior art, it is known to provide a system that allows a called party, while engaged in a first call, to indicate to a second call party that he/she is aware of the second call and will respond to the second call within a waiting time interval. The second calling party is given a "personal answer" message indicating that the called party will answer the second call within the waiting interval. The second calling party is then placed on hold so that when the called party terminates the first call, the called party can answer the second call. However, the prior art does not teach how to resolve the problem of the user of the wireless telephone who is attempting to reach a location where they can respond to the incoming call.

SUMMARY OF THE INVENTION

A method and apparatus for alerting a calling party of a delay before an incoming call will be answered by a user of a called telecommunication terminal. The incoming call is answered by the telecommunication terminal or a switching system to which the telecommunication terminal is connected in response to an input from the user when the telecommunication terminal is not engaged in another call. An audio path of the answered call is muted from communication with the user. A message is transmitted to the calling party where the message is selected by the user.

DETAILED DESCRIPTION

Figure 1:
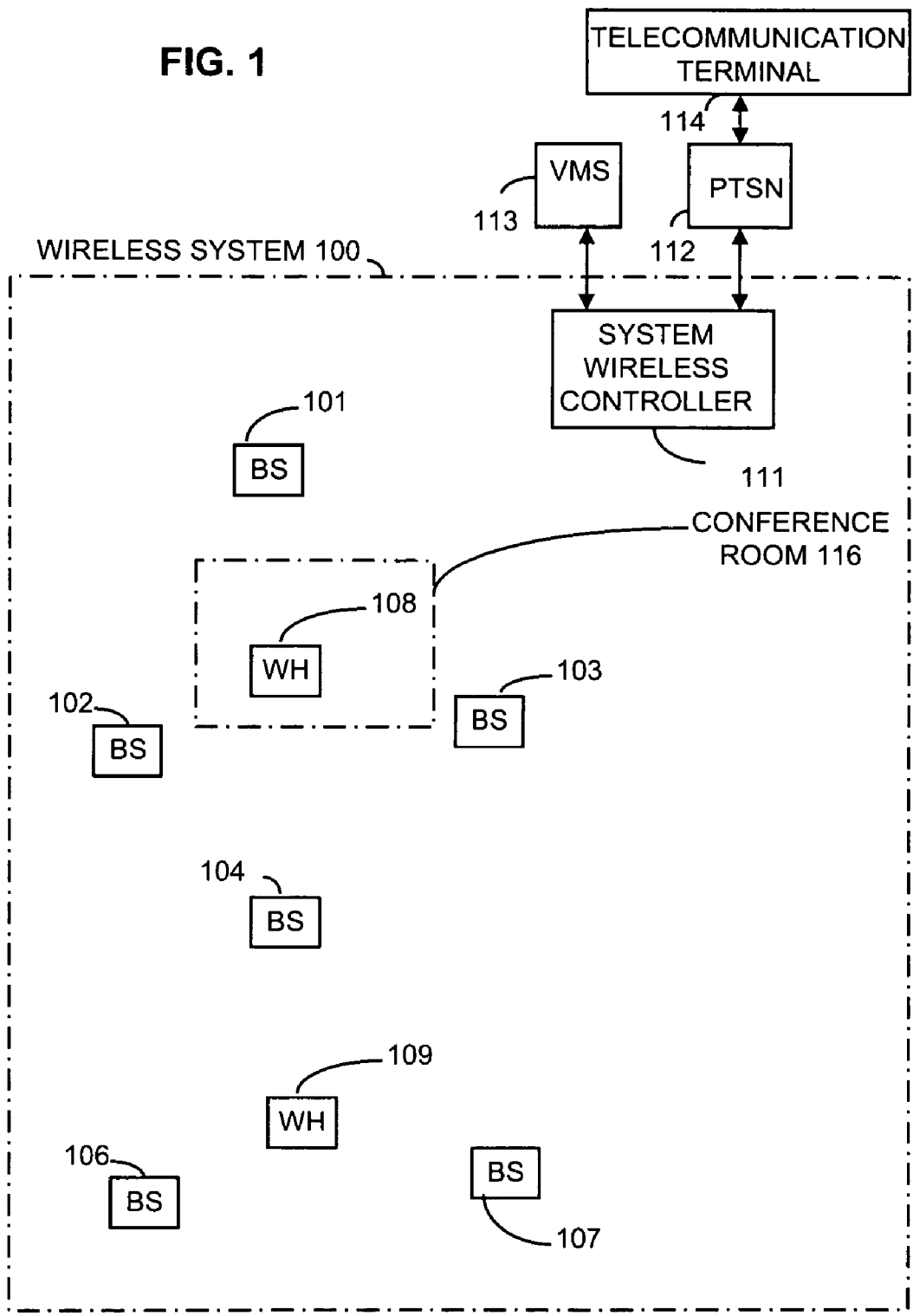
FIG. 1 illustrates, in block diagram form, an embodiment of a system.

FIG. 1 illustrates, in block diagram form, embodiments of the invention. In wireless system 100, system wireless controller 111 is providing overall control of the wireless network composed of base stations 101-107 which are servicing handsets 108-109. System wireless controller 111 also interfaces to public telephone switching network (PTSN) 112 and provides voice messaging support for the wireless handsets by interfacing to voice messaging system (VMS) 113. Although, system wireless controller 111 is illustrated as being connected to the PTSN 112, system wireless controller 111 could also be connected to a private switching system such as a PBX. One skilled in the art would readily realize that wireless system 100 could be an integral part of a PBX. System 100 is servicing one or more buildings plus open space. Wireless handset 108 is illustrated as being in a conference room (conference room 116).

To illustrate the various embodiments, consider the following example. Telecommunication terminal 114 places a call to wireless handset 108 via PTSN 112, system wireless controller 111, and base station 103. (Note, wireless handset 109 or any other telecommunication terminal could be placing the call in this example.) The user of wireless handset 108 is presently in conference room 116 and does not wish to answer the call while in conference room 116. In one embodiment, the user presses one or more buttons on wireless handset 108. Wireless handset 108 is responsive to these button actuations to transmit an audio message to telecommunication terminal 114 that the user will answer the call in a specified amount of time. Wireless handset 108 performs this operation by answering the call and sending the voice message directly to telecommunication terminal 114 over the call path that is set up. In one embodiment, wireless handset 108 then sends the necessary control information to system wireless controller 111 to place the incoming call on hold. In another embodiment, wireless handset 108 simply mutes the voice information but maintains the call path. The audio message that is transmitted is stored internally to wireless handset 108. In another embodiment, the wireless handset 108 transmits the audio message which indicates that the user will call the user of telecommunication terminal 114 in a fixed amount of time and terminates the incoming call. In the preceding embodiments, wireless handset 108 controlled all of the operations directed to informing the telecommunication terminal 114 that the call would be answered in a period of time. Note, that the user of wireless handset 108 has the capability of specifying how long the time will be before the call is answered in the message that is transmitted to telecommunication terminal 114.

In another embodiment, wireless handset 108 is responsive to the incoming call and actuation of buttons or the use of a menu system to transmit a text message utilizing the TXT messaging service of the system wireless controller. This is particularly useful when the calling telecommunication terminal is another wireless handset such as wireless handset 109. Again, upon sending the text message to the calling party, wireless handset 108 can place the incoming call on hold, stay connected on the call, or terminate the call. If the call is terminated, the user of wireless handset 108 will originate a new call to the original calling party. Where telecommunication terminal 114 has a digital display or it is being implemented as a soft phone on a personal computer, the text message will be displayed on the digital display or the display screen of the personal computer.

In another embodiment, the user of wireless handset 108 does not actuate buttons or a menu system, but rather, wireless handset 108 detects that the user is moving from conference room 116 and automatically sends either an audio message or a text message to the calling party. Techniques for a wireless handset to detect its location and movement are well known to those skilled in the art. U.S. Pat. Nos. 6,125,285, 6,195,558, and 6,236,858 disclose methods and systems for locating wireless handsets and are hereby incorporated by reference. U.S. patent application Ser. No. 10/140,134, filed May 6, 2002, and assigned to the same assignee as the present patent application discloses methods and systems for locating wireless handsets and is hereby incorporated by reference.

In another embodiment, wireless handset 108 is responsive to actuations of buttons or menu operations to transmit a message to system wireless controller 111. The message informs system wireless controller 111 that the user will answer the call within a specified amount of time and that system wireless controller 111 is to place the call on hold. After placing the call on hold, system wireless controller 111 utilizes an internal voice response unit or voice messaging system 113 to transmit an audio or text message to the calling party. If the wireless handset 108 signals that the user will call the calling party back within a predetermined amount of time, system wireless controller 111 will transmit either a text or audio message to the calling party and disconnect the incoming call.

In another embodiment, when an incoming call is placed to wireless handset 108 by system wireless controller 111, system wireless controller 111 monitors the movement of wireless handset 108 to determine if wireless handset 108 is leaving conference room 116. If the movement is detected, system wireless controller 111 sends the appropriate message to the calling party.

Figure 2:
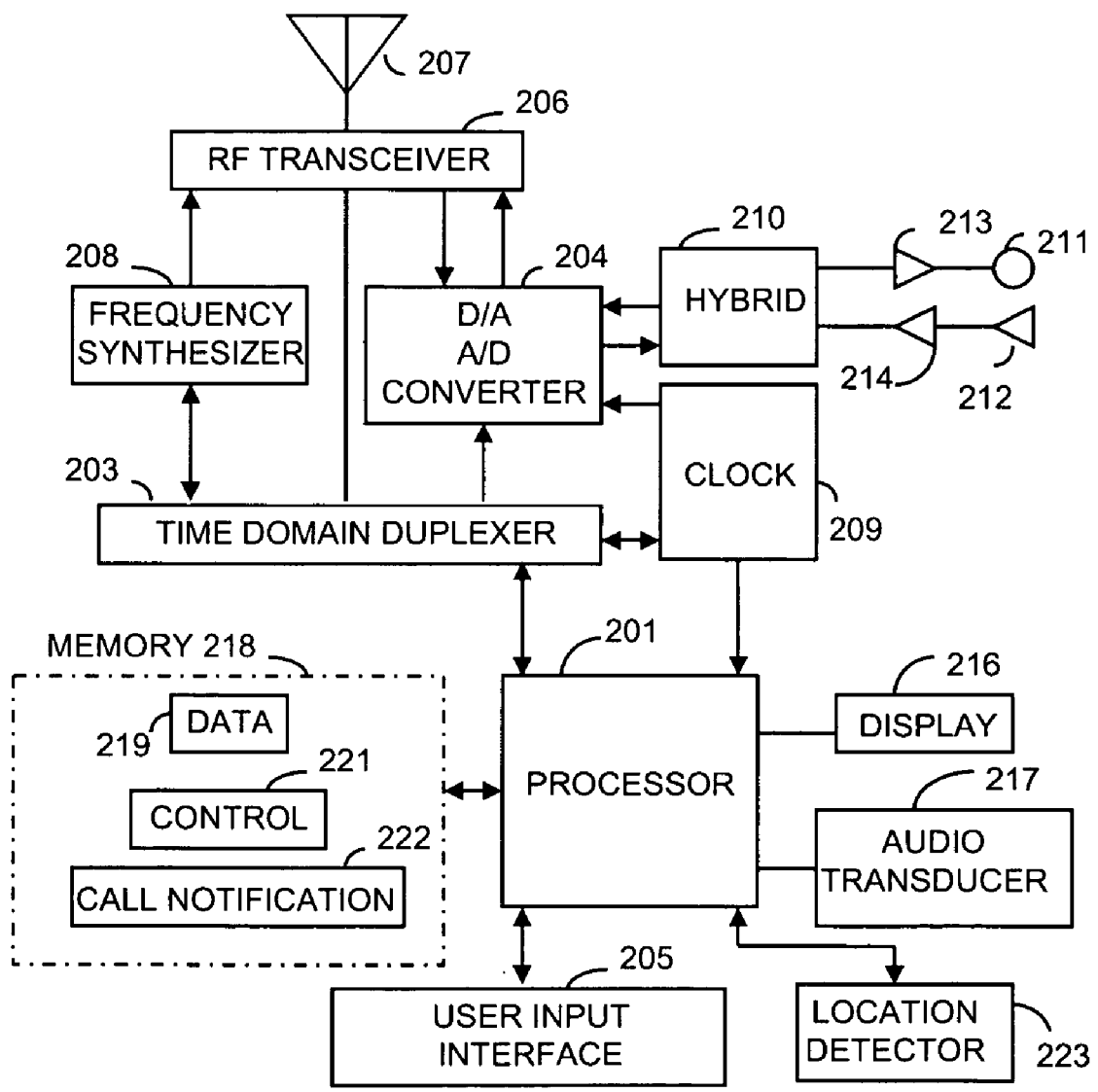
FIG. 2 illustrates, in block diagram form, an embodiment of a wireless handset.

FIG. 2 illustrates, in block diagram form, an embodiment of a wireless handset. Elements 203-208 along with clock 209 provide the basic radio frequency functions. Clock 209 provides timing for the basic radio frequency functions as well as providing clock signals for processor 201. Hybrid 210 and elements 211-214 provide audio output and input for a user. Audio transducer 217 provides either an audio or vibrating alerting signal to the user for different types of situations of which processor 201 wishes to make the user aware. Display 216 is utilized to display information to the user by processor 201. User input interface 205 provides the basic interface by which a user signals processor 201 of the wishes of the user. User interface 205 may include, but is not limited to, a keypad, distinct buttons, and a menu actuation pad. Processor 201 controls the overall operation of the wireless handset by executing control routine 221 in memory 218. The call notification functions are performed by processor 201 executing routine 222. Data block 219 stores the data that processor 201 utilizes to perform its functions. In one embodiment, location detector 223 determines the location and movement of the wireless handset. In another embodiment, processor 201 performs location functions.

The utilization of location and/or movement to determine whether to send a message to the calling party indicating that the called party will answer the call within some predetermined or adjustable amount of time is determined in the following ways. In situations where the detection is to be from a physical location such as a conference room or office, the determination of sending a message to the calling party can be based either on the distance the handset moves after receiving the incoming call or the speed at which the handset is moving. If speed is utilized to make this determination, then the speed would have to be maintained for some interval. In a second situation, consider where the handset is in an automobile, a deceleration in speed could be utilized to transmit a message indicating delay to the calling party. Such a deceleration would be assumed to indicate that the driver of the automobile is pulling over in order to answer the incoming call.

Figure 3:
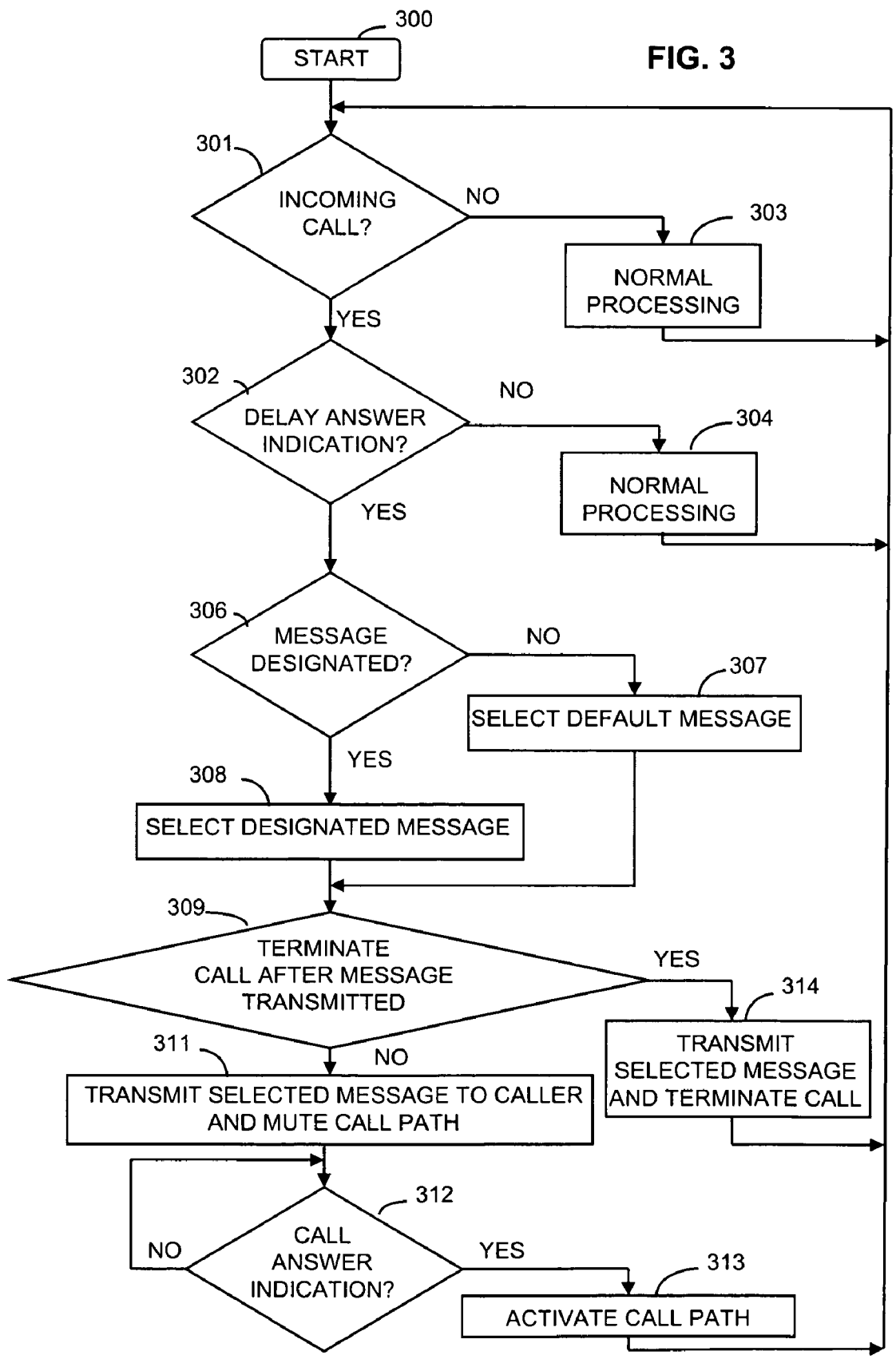
FIG. 3 illustrates, in flowchart form, an embodiment for implementing the operations of a wireless handset.

FIG. 3 illustrates, in flowchart form, an embodiment of operations performed by a wireless handset, a hardwired telephone, or any other type of communication terminal responding to incoming audio calls such as, but not limited to, a personal computer implementing an IP softphone function. Once started in block 300, decision block 301 determines if there is an incoming call. If the answer is no, block 303 performs normal processing before returning control back to decision block 301. If the answer in decision block 301 is yes, decision block 302 determines if the user is indicating that they wish to delay responding to the call for a period of time. The user may indicate this wish in a variety of ways, and it results in a delay answer indication being given to the controller controlling the handset. If the answer is no in decision block 302, control is transferred to decision block 304 which performs normal processing before returning control back to decision block 301. If the answer is yes in decision block 302, decision block 306 tests for an indication that the user is designating the type of message to be transmitted to the caller. If the answer in decision block 306 is no, block 307 selects the default message before transferring control to decision block 309. The default message would specify a predefined amount of time within which the user would respond to the caller. If the answer in decision block 306 is yes, block 308 selects the designated message before transferring control to block 309. Greater detail on the operation of block 308 is given in the flowchart of FIG. 4.

Decision block 309 determines if either the selected designated message or selected default message is requesting that the incoming call be terminated after the message is transmitted. Note, that the call being terminated in this context means that the call is dropped. If the answer in decision block 309 is yes, control is transferred to block 314 which transmits the selected message and terminates the call before returning control back to decision block 301.

If the answer in decision block 309 is no, block 311 transmits the selected message to the caller and mutes the call path so that no audio information is transmitted by the handset or is received by the handset. After execution of block 311, block 312 waits for the indication from the user of the handset that they now wish to answer the incoming call. If the answer in decision block 312 is no, decision block 312 is re-executed. In addition, one skilled in the art would readily realize that decision block 312 would wait for some predefined amount of time before terminating the operations and returning control back to decision block 301. If the answer in decision block 312 is yes, block 313 activates the call path so that the calling party can talk to the user of the handset before returning control back to decision block 301.

Figure 4:
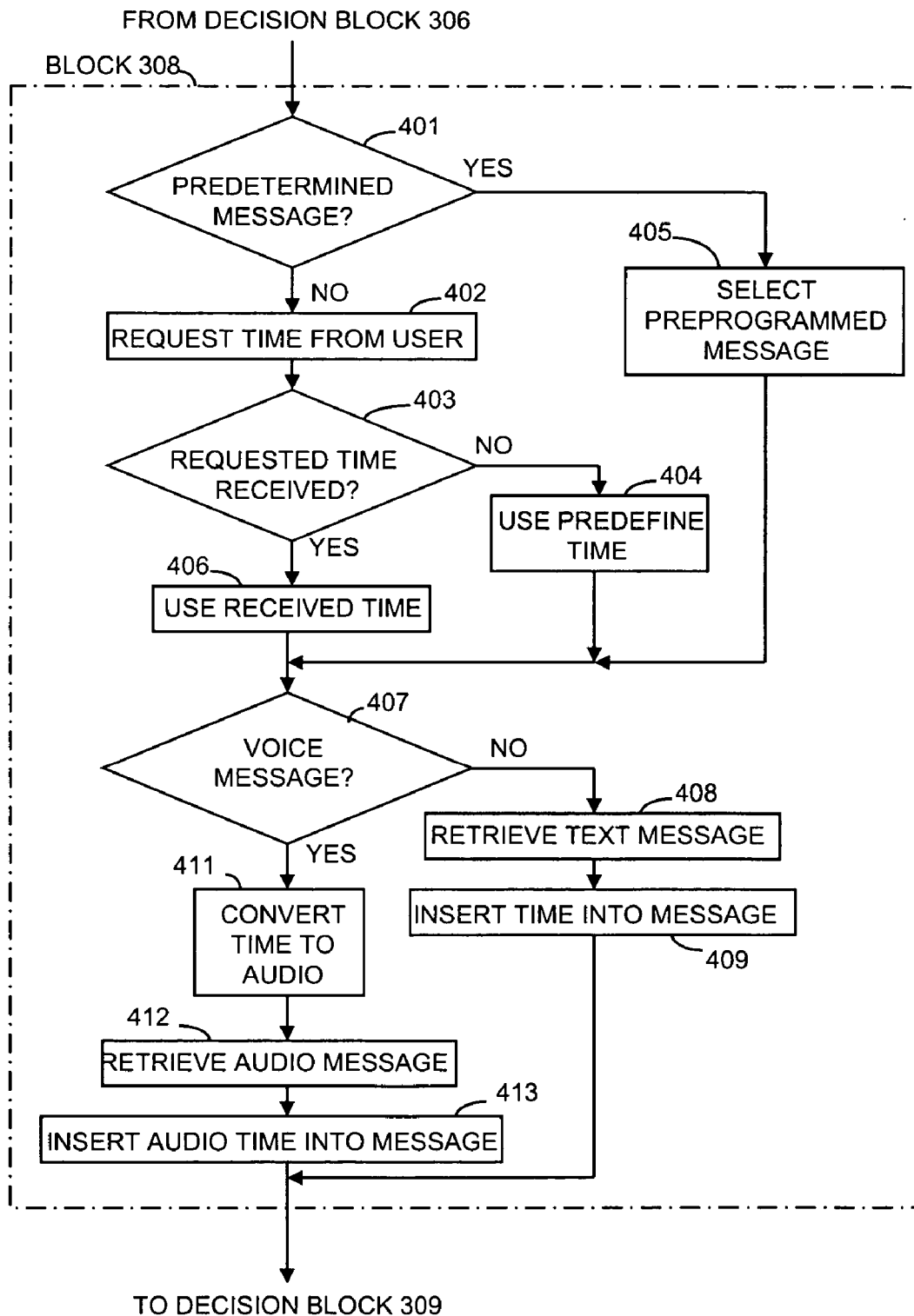
FIG. 4 illustrates, in flowchart form, greater details of a portion of FIG. 3.

FIG. 4 illustrates, in flowchart form, additional details of the operation of block 308 of FIG. 3. Decision block 401 receives control from decision block 306. Decision block 401 determines if the user has selected a predetermined message. The user may program the handset to have, for example, four audio messages each having a different time in which the user promises to call the calling party back. If the answer is yes in decision block 401, control is transferred block 405 that allows the user to select one of the preprogram audio messages before transferring control to decision block 407. If there is only one preprogram message, block 405 immediately transfers control to decision block 407. If the answer in decision block 401 is no, block 402 requests the time from the user that will define how long the calling party can expect to wait before the user will respond to the incoming call. Block 402 transfers control to decision block 403 which determines if the requested time has been received from the user. The user would enter the requested time using the user input interface of the handset or some other input device. If the answer is no in decision block 403, block 404 uses a predefined time as the time. If the answer is yes in decision block 403, block 406 sets the time to be the received time from the user before transferring control to decision block 407.

Decision block 407 determines if the message to be transmitted to the calling party is to be a voice message. If the answer is no in decision block 407, block 408 retrieves the text message, and block 409 inserts the time determined either by block 404 or 406 into this retrieved message before transferring control to decision block 309 of FIG. 3. If the answer in decision block 407 is yes, block 411 converts the time received from the user to audio information before transferring control to block 412. Block 412 retrieves the standard body of the audio message from storage, and block 413 inserts the audio information defining the time into the retrieved body of the audio message before transferring control to decision block 309 of FIG. 3.

Figure 5:
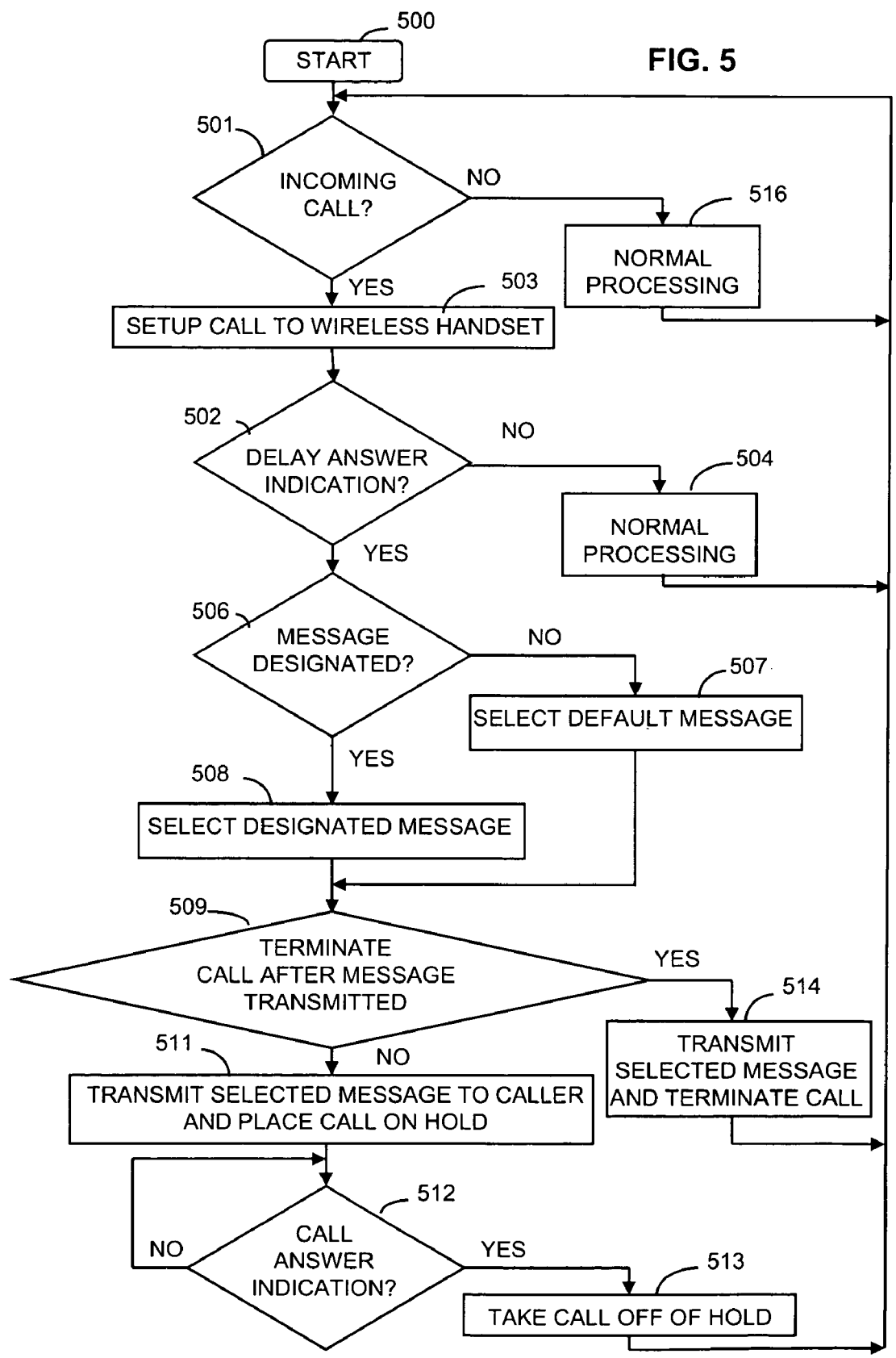
FIG. 5 illustrates, in flowchart form, operations performed by a system controller.
Figure 6:
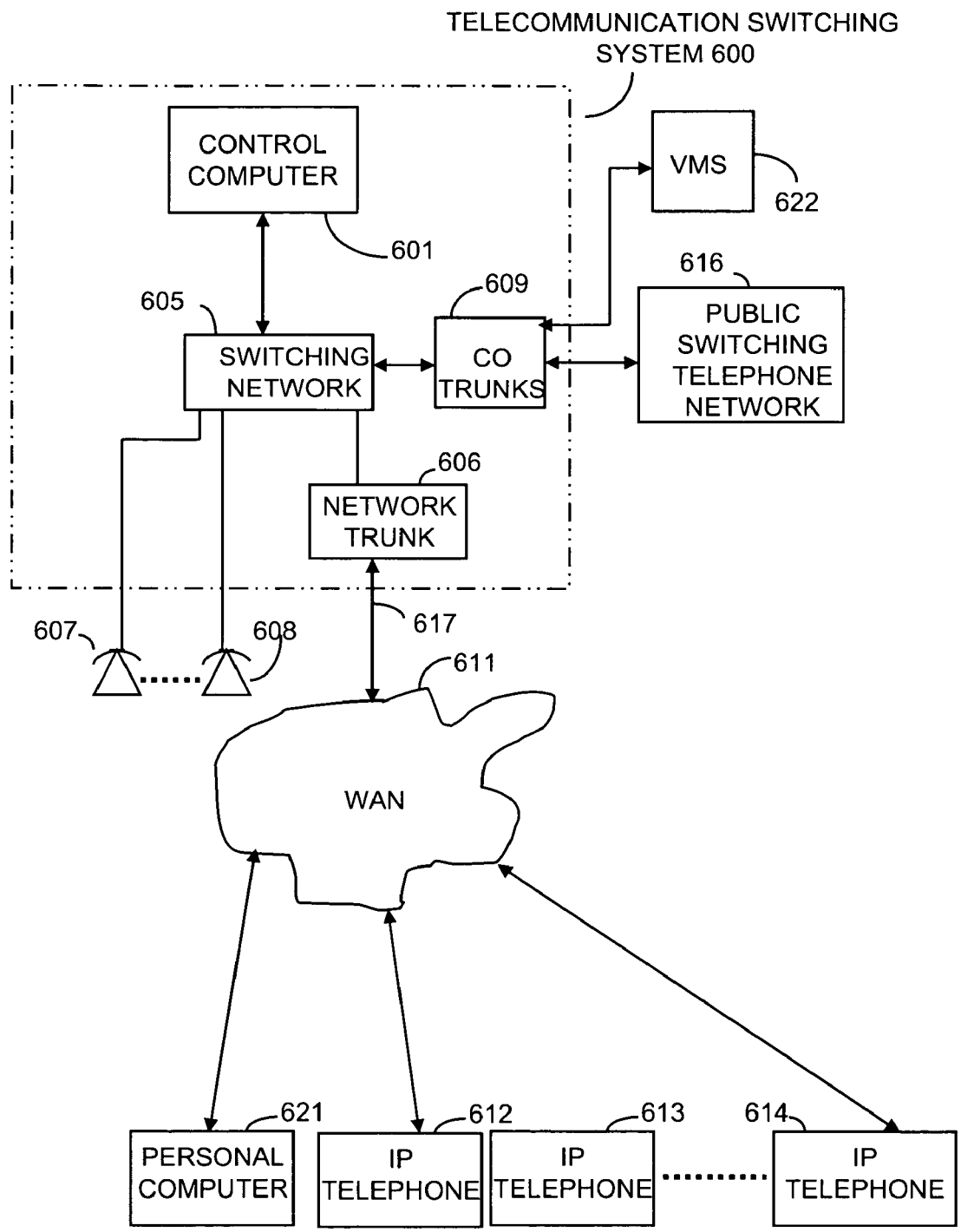
FIG. 6, illustrates, in block diagram form, another embodiment of a system.

FIG. 5 illustrates, in flowchart form, an embodiment of operations performed by a switching system such as system wireless controller 111 of FIG. 1 or telecommunication switching system 601 of FIG. 6, a hardwired telephone, or any other type of communication terminal responding to incoming audio calls such as, but not limited to, a personal computer implementing an IP softphone function. Once started in block 500, decision block 501 determines if there is an incoming call. If the answer is no, block 503 performs normal processing before returning control back to decision block 501. If the answer in decision block 501 is yes, decision block 502 determines if the user is indicating via the telecommunication terminal that they wish to delay responding to the call for a period of time. The user may indicate this wish in a variety of ways, and it results in a delay answer indication being given to the controller controlling the handset. If the answer is no in decision block 502, control is transferred to decision block 504 which performs normal processing before returning control back to decision block 501. If the answer is yes in decision block 502, decision block 506 tests for an indication that the user is designating the type of message to be transmitted to the caller. If the answer in decision block 506 is no, block 507 selects the default message before transferring control to decision block 509. The default message would specify a predefined amount of time within which the user would respond to the caller. If the answer in decision block 506 is yes, block 508 selects the designated message before transferring control to block 509. Greater detail on the operation of block 508 is similar to that given with respect to the flowchart of FIG. 4.

Decision block 509 determines if either the selected designated message or selected default message is requesting that the incoming call be terminated after the message is transmitted. Note, that the call being terminated in this context means that the call is dropped. If the answer in decision block 509 is yes, control is transferred to block 514 which transmits the selected message and terminates the call before returning control back to decision block 501.

If the answer in decision block 509 is no, block 511 transmits the selected message to the caller and mutes the call path so that no audio information is transmitted by the handset or is received by the handset. After execution of block 511, block 512 waits for the indication from the user of the handset that they now wish to answer the incoming call. If the answer in decision block 512 is no, decision block 512 is re-executed. In addition, one skilled in the art would readily realize that decision block 512 would wait for some predefined amount of time before terminating the operations and returning control back to decision block 501. If the answer in decision block 512 is yes, block 513 activates the call path so that the calling party can talk to the user of the handset before returning control back to decision block 501.

FIG. 6 illustrates, in block diagram form, an embodiment of the invention. Telecommunication switching system 600 is providing telephone service for IP telephones 612-614 via wide area network (WAN) 611. In addition, telecommunication switching system 600 may provide service for telephones such as telephones 607-608 that are directly connected to switching network 605 utilizing a proprietary digital protocol, an ISDN protocol, or an analog protocol. Telecommunication switching system 600 interconnects to public switching telephone network 616 via central office trunks 609. Telecommunication switching system 600 interfaces to WAN 611 via network trunk 606. Control computer 601 controls the overall operation of telecommunication switching system 600.

When the operations of devices 111, 201, or 601 are implemented in software, as is shown in FIGS. 3-5, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Devices 111, 201, or 601 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where devices 111, 201, or 601 are implemented in hardware, devices 111, 201, or 601 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modification to the illustrated embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for alerting a calling party of a delay before an incoming call will be answered by a user of a called wireless handset, comprising the steps of:
 answering the incoming call by the wireless handset in response to a predefined amount of movement in a physical location of the wireless handset as detected by the wireless handset when the telecommunication terminal is not engaged in another call with the predefined amount of movement occurring after the incoming call is received by the wireless handset;
 muting an audio path of the answered call from communication with the user; and
 transmitting a message that is selected by the user to the calling party.

2. The method of claim 1 further comprises the step of maintaining the incoming call from the calling party with the audio path muted to the user; and
 allowing audio communication by the user with calling party in response to another input from the user.

3. The method of claim 1 further comprises the step of terminating the incoming call after transmission of the message.

4. The method of claim 1 wherein the message is an audio message and the audio message is transmitted via the audio path to the calling party.

5. The method of claim 4 further comprises the steps of receiving a time specifying the delay; and
 inserting the time into a predefined message.

6. The method of claim 5 wherein the step of inserting comprises converting the time to audio information for insertion into the predefined message.

7. The method of claim 6 further comprises the step of recording the predefined message.

8. The method of claim 1 wherein the message is a text message.

9. The method of claim 8 further comprises the steps of receiving a time specifying the delay; and
 inserting the time into a predefined message.

10. The method of claim 9 further comprises the step of entering the predefined message.

11. The method of claim 8 wherein the transmission of the text message is via a text messaging link.

12. A processor-readable medium for alerting a calling party of a delay before an incoming call will be answered by a user of a called wireless handset, comprising processor-executable instructions configured for:
 answering the incoming call by the wireless handset in response to a predefined amount of movement in a physical location of the wireless handset as detected by the wireless handset when the telecommunication terminal is not engaged in another call with the predefined amount of movement occurring after the incoming call is received by the wireless handset;
 muting an audio path of the answered call from communication with the user; and
 transmitting a message that is selected by the user to the calling party.

13. The processor-readable medium of claim 12 further comprises maintaining the incoming call from the calling party with the audio path muted to the user; and
 allowing audio communication by the user with calling party in response to another input from the user.

14. The processor-readable medium of claim 12 further comprises terminating the incoming call after transmission of the message.

15. The processor-readable medium of claim 12 wherein the message is an audio message and the audio message is transmitted via the audio path to the calling party.

16. The processor-readable medium of claim 15 further comprises receiving a time specifying the delay; and
 inserting the time into a predefined message.

17. The processor-readable medium of claim 16 wherein the inserting comprises converting the time to audio information for insertion into the predefined message.

18. The processor-readable medium of claim 17 further comprises recording the predefined message.

19. The processor-readable medium of claim 12 wherein the message is a text message.

20. The processor-readable medium of claim 19 further comprises receiving a time specifying the delay; and
 inserting the time into a predefined message.

21. The processor-readable medium of claim 20 further comprises entering the predefined message.

22. The processor-readable medium of claim 19 wherein the transmission of the text message is via a text messaging link.

23. An apparatus for alerting a calling party of a delay before an incoming call will be answered by a communication terminal, comprising:
 means for detecting the incoming call while the communication terminal is not engaged in another call;
 means for detecting movement in a physical location of the communication terminal with the detected movement occurring after the detection of the incoming call; and
 means for transmitting a message to the calling party upon detection of the incoming call and movement.

24. The apparatus of claim 23 wherein the means for transmitting comprises means for sending a textual message.

* * * * *